UNITED STATES PATENT OFFICE 2,283,823

MONOAZO DYESTUFFS SOLUBLE IN WATER

Adolf Sieglitz and Martin Reuter, Frankfort-on-the-Main, Germany, assignors to General Aniline & Film Corporation, New York, N. Y., a corporation of Delaware No Drawing. Application October 8, 1940, Serial No. 360,242. In Germany November 7, 1939

5 Claims. (Cl. 260—158)

The present invention relates to monoazo-dyestuffs soluble in water; more particularly it relates to the dyestuffs of the folowing general formula:

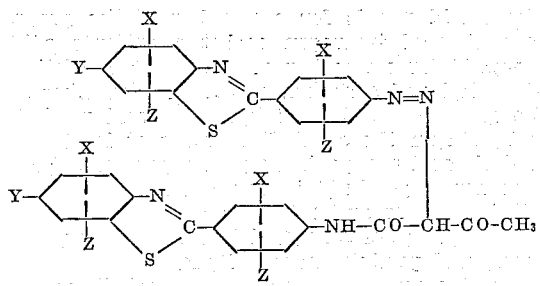

wherein X stands for hydrogen or a sulfonic acid group, Y for methyl or a carboxyl group and Z for hydrogen or methyl, and whereby the dyestuff contains at least two sulfonic acid groups.

We have found that valuable monoazo-dyestuffs are obtained by coupling the diazo-compound from an amine of the general formula:

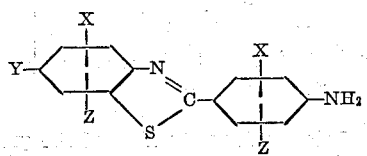

with an acetoacetyl compound of the general formula:

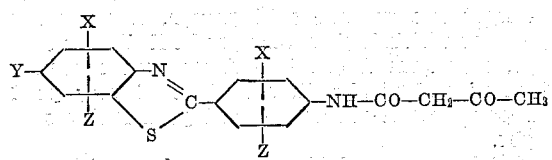

wherein X stands for hydrogen or a sulfonic acid group, Y for methyl or a carboxyl group and Z for hydrogen or a methyl group, and, if desired, sulfonating the dyestuff obtained, wherein the finished dyestuff contains at least two sulfonic acid groups.

The dyestuffs thus obtained are distinguished by a very good affinity for cotton fibers and regenerated cellulose fibers as well as for mixtures of these fibers and yield yellow dyeings of very good fastness to wet-processing and good fastness to light.

The acetoacetyl compounds used as coupling components may be obtained by causing the corresponding 2-(4'-aminophenyl)-benzothiazoles to react with diketene.

The following examples serve to illustrate the invention, but they are not intended to limit it thereto; the parts are by weight:

1. 320 parts of 2-(4'-aminophenyl) 6-methylbenzothiazole-7-sulfonic acid are diazotized in the usual manner. The suspension of the diazo-compound is then introduced into a solution of 404 parts of 2-(4'-acetoacetylaminophenyl)-6-methylbenzothiazole-7-sulfonic acid (obtainable by causing diketene to act upon 2-(4'-aminophenyl)-6-methylbenzothiazole-7-sulfonic acid) and 212 parts of sodium carbonate in water. When the coupling is finished the dyestuff is salted out, filtered with suction and dried. It is a yellow powder which has a very good affinity for cotton and viscose silk. The greenish yellow dyeings obtained are distinguished by a very good fastness to water and to washing and a good fastness to light. A mixed fabric consisting of 50 parts of cotton and 50 parts of staple fiber from viscose is dyed greenish-yellow tone-in-tone tints. The dyestuff corresponds with the following formula:

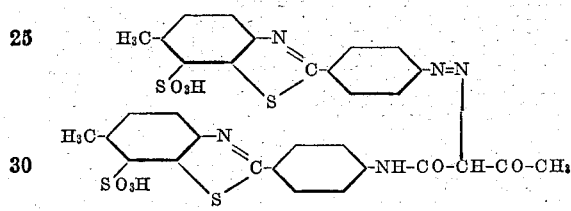

2. 400 parts of 2-(4'-aminophenyl-6-methylbenzothiazole-3'.7-disulfonic acid are diazotized in the usual manner and the diazo-compound is coupled with 404 parts of 2-(4'-acetoacetylaminophenyl)-6-methylbenzothiazole-7-sulfonic acid in a solution rendered alkaline with sodium carbonate. The dyestuff obtained dyes cotton and viscose silk greenish-yellow tints of very good fastness to water and to washing and good fastness to light.

3. 350 parts of 2-(4'-aminophenyl)-benzothiazole-7-sulfonic acid 6-carboxylic acid (obtainable according to Example 1 of German patent specification No. 277,395) are diazotized in the usual manner and the diazo-compound is coupled with 404 parts of 2-(4'-acetoacetylaminophenyl)-6- methylbenzothiazole - 3' - sulfonic acid in a solution rendered alkaline with sodium carbonate. The dyestuff obtained dyes cotton greenish-yellow tints of very good fastness to water and to washing and good fastness to light.

If in the foregoing example the 404 parts of 2-(4'-acetoacetylaminophenyl) - 6-methylbenzothiazole-3'-sulfonic acid are replaced by the same amount of 2-(4'-acetoacetylaminophenyl)-6-methylbenzothiazole-7-sulfonic acid, a dyestuff of similar properties is obtained.

4. 320 parts of 2-(4'-aminophenyl)-6-methylbenzothiazole-7-sulfonic acid are diazotized in the usual manner and coupled with a solution rendered alkaline with sodium carbonate of 434 parts of 2-(4'-acetoacetylaminophenyl)-benzothiazole-7-sulfonic acid-6-carboxylic acid. The dyestuff obtained is a yellow powder which dyes cotton greenish-yellow tints of very good fastness to water and to washing and good fastness to light.

5. 10 parts of the monoazo-dyestuff obtained from diazotized 2-(4'-aminophenyl)-6-methylbenzothiazole-3'-sulfonic acid and 2-(4'-acetoacetylaminophenyl) - 6 - methylbenzothiazole-7-sulfonic acid are introduced into 90 parts of sulfuric acid monohydrate; 50 parts of fuming sulfuric acid containing 60 per cent. of sulfuric anhydride are added thereto drop by drop. After a 12 hours' stirring at 20° C. the solution is poured on ice, the precipitate is filtered with suction, washed with a sodium chloride solution and dried. The dyestuff obtained dyes cotton and viscose silk yellow tints of good fastness to water and to washing.

6. 10 parts of the monoazo-dyestuff obtained from diazotized 2-(4'-aminophenyl)-6-methylbenzothiazole and 2-(4'-acetoacetylaminophenyl)-6-methylbenzothiazole-3'-sulfonic acid are introduced into 90 parts of sulfuric acid monohydrate and at 25° C. 50 parts of fuming sulfuric acid containing 60 per cent. of sulfuric anhydride are added drop by drop. After a two hours' stirring the whole is worked up as usual. The dyestuff obtained is a yellow powder which dyes cotton yellow tints of good fastness to water and to washing.

7. 50 parts of the monoazo-dyestuff obtained from diazotized 2-(4'-aminophenyl)-6-methylbenzothiazole and 2-(4'-acetoacetylaminophenyl)-6-methylbenzothiazole are dissolved in 200 parts of sulfuric acid monohydrate and 150 parts of fuming sulfuric acid containing 60 per cent. of sulfuric anhydride are introduced. After a two hours' stirring the whole is worked up as usual. The dyestuff obtained dyes cotton yellow tints of good fastness to water and to washing.

8. 320 parts of 2-(4'-aminophenyl)-6-methylbenzothiazole-7-sulfonic acid are diazotized in the usual manner and the diazo-compound is coupled with 404 parts of 2-(4'-acetoacetylaminophenyl)-6-methylbenzothiazole-3'-sulfonic acid in a solution rendered alkaline with sodium carbonate. The dyestuff obtained dyes cotton and viscose silk greenish-yellow tints of very good fastness to water and to washing and good fastness to light.

9. 348 parts of 2-(4'-aminophenyl)-3'.4.6-trimethylbenzothiazole-7-sulfonic acid are diazotized in the usual manner and the diazo-compound is coupled with 404 parts of 2-(4'-acetoacetylaminophenyl) - 6 - methylbenzothiazole-7-sulfonic acid in a solution rendered alkaline with sodium carbonate. The dyestuff obtained dyes cotton and regenerated cellulose fibers greenish-yellow tints of very good fastness to water and to washing.

A similar dyestuff is obtained, if in the foregoing example 432 parts of 2-(4'-acetoacetylaminophenyl) - 3'.4.6 - trimethylbenzothiazole-7-sulfonic acid are used as coupling component.

10. 350 parts of 2-(4'-aminophenyl)-benzothiazole-7-sulfonic acid-6-carboxylic acid are diazotized in the usual manner and the diazo-compound is coupled with 432 parts of 2-(4'-acetoacetylaminophenyl) - 3'.4.6 - trimethylbenzothiazole-7-sulfonic acid. The dyestuff obtained dyes cotton and regenerated cellulose fibers greenish-yellow tints of very good fastness to water and to washing.

We claim:

1. The water-soluble monoazo-dyestuffs corresponding with the following general formula:

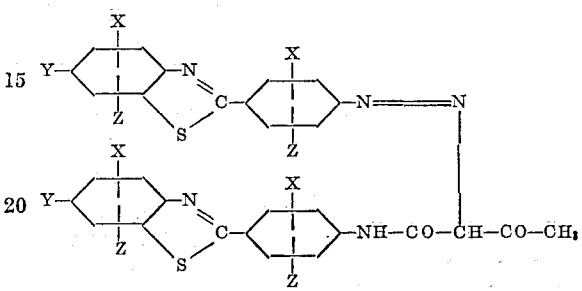

wherein X stands for a member of the group consisting of hydrogen and the sulfonic acid group, Y for a member of the group consisting of methyl and carboxyl, and Z for a member of the group consisting of hydrogen and methyl, and wherein the dyestuff contains at least two sulfonic acid groups, being yellow powders which have a very good affinity for cotton, regenerated cellulose fibers and mixtures thereof and yield yellow dyeings of very good fastness to wet-processing and good fastness to light.

2. The water-soluble monoazo-dyestuffs corresponding with the following general formula:

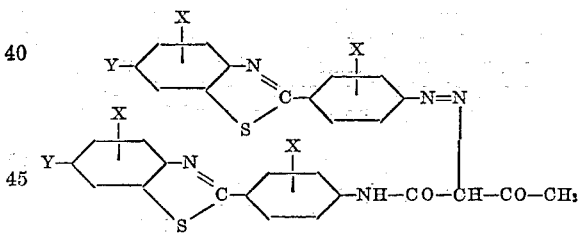

wherein X stands for a member of the group consisting of hydrogen and the sulfonic acid group, Y for a member of the group consisting of methyl and carboxyl, and wherein the dyestuff contains at least two sulfonic acid groups, being yellow powders which have a very good affinity for cotton, regenerated cellulose fibers and mixtures thereof and yield yellow dyeings of very good fastness to wet-processing and good fastness to light.

3. The water-soluble monoazo-dyestuff corresponding with the following formula:

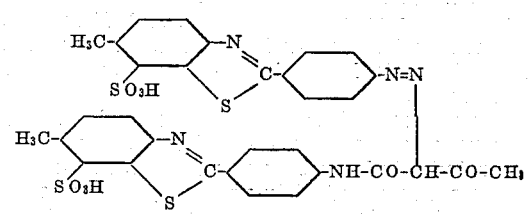

being a yellow powder which has a very good affinity for cotton, regenerated cellulose fibers and mixtures thereof and yields greenish-yellow dyeings of very good fastness to water and to washing and good fastness to light.

4. The water-soluble monoazo-dyestuff corresponding with the following formula:

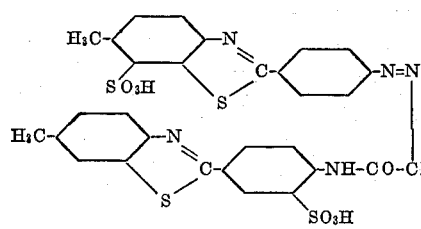

being a yellow powder which has a very good affinity for cotton, regenerated cellulose fibers and mixtures thereof and yields greenish yellow dyeings of very good fastness to water and to washing and good fastness to light.

5. The water-soluble monoazo-dyestuff corresponding with the following formula:

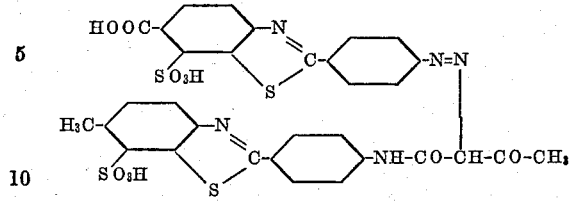

being a yellow powder which has a very good affinity for cotton, regenerated cellulose fibers and mixtures thereof and yields greenish yellow dyeings of very good fastness to water and to washing and good fastness to light.

ADOLF SIEGLITZ.
MARTIN REUTER.